United States Patent

Bauer et al.

[11] Patent Number: 5,974,909
[45] Date of Patent: Nov. 2, 1999

[54] CONTROL-KNOB TOP PART

[75] Inventors: Karl-Heinz Bauer, Bad Neustadt; Klaus Mueller, Unsleben; Reinhold Moret, Mellrichstadt, all of Germany

[73] Assignee: Preh-Werke GbmH & Co. KG, Bad Neustadt/Saale, Germany

[21] Appl. No.: 08/922,364

[22] Filed: Sep. 3, 1997

[30] Foreign Application Priority Data

Sep. 10, 1996 [DE] Germany ............................. 19636643

[51] Int. Cl.⁶ .................................................. G05G 1/10
[52] U.S. Cl. ...................... 74/553; 16/DIG. 10; 16/118; 16/121
[58] Field of Search .................... 74/553, 558, 558.5; 16/DIG. 12, 118, 121

[56] References Cited

U.S. PATENT DOCUMENTS 2,763,231  9/1956  Neugass .

FOREIGN PATENT DOCUMENTS 1 936 846  4/1966  Germany .
87 02 558  8/1987  Germany .

*Primary Examiner*—Tamara L. Graysay
*Assistant Examiner*—Chong H. Kim
*Attorney, Agent, or Firm*—Griffin, Butler, Whisenhunt & Szipl, LLP

[57] ABSTRACT

A control knob (1) includes a companion part (2) as a base of the control knob and a control-knob top part (3) having a grip handle (4). The control-knob top part (3) includes a plate (9) having a flexible elastic material coated thereon to form sidewalls (5.1) of the grip handle (4) which can be flexibly deformed when the grip handle (4) is manipulated. This provides improved manipulation and quiet operation of the control knob (1). Additional push-button and switch functions can be included via a flexible facing wall (5.2) on the grip handle (4).

10 Claims, 4 Drawing Sheets

CONTROL-KNOB TOP PART

BACKGROUND OF THE INVENTION

This invention relates to a control-knob top part for a control knob for activating a control element, specifically a ventilation, an air-conditioning, or a heating control element, in an automobile, that, on the one hand, is coupled to an adjusted member on an inwardly-facing side and, on the other hand, has a hollow grip handle on an outwardly facing side.

German patent document (G 87 02 558.2) discloses a generally-round control knob for a switch which has an open space for containing an incandescent bulb in a generally known manner. Several fiber-optic cables, or light guides, in this round control knob indicate positions of the control knob, and, thus, of the switch.

Many other known control knobs, particularly those for switches and potentiometers of automobile dashboards for controlling ventilation, heating, or air conditioning equipment, have wedge-shaped grip portions adjacent round control-knob bases.

Demands are increasing in automotive technology to provide smaller operating devices on instrument panels and to offer more controls in reach of drivers. These demands also place additional limitations on sizes of control knobs; with smaller control knobs creating problems relating to insufficient force transmission and poor serviceability of adjustable units.

It is an object of this invention to provide a control knob for resolving these problems.

SUMMARY

A control-knob top part is formed of a hard-material component part having a surrounding coating of an elastomer material thereon. The hard-material component part comprises a plate having perpendicular columnar support members opposite each other, standing adjacent an edge of the plate. The coating forms elastic sidewalls of a grip handle, enclosing a space between the columnar support members. The support members and the coating form the grip handle.

In one embodiment a control-knob top part is formed of a base plate of hard material, and an elongated hollow grip handle is formed of an elastic elastomer on the base plate. The elongated hollow grip handle has broad sidewalls and narrower end walls extending approximately perpendicularly away from the base plate, with the narrower end walls having a greater wall thickness than that of the sidewalls.

BRIEF DESCRIPTION OF THE DRAWINGS

The invention is described and explained in more detail below using an embodiment shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
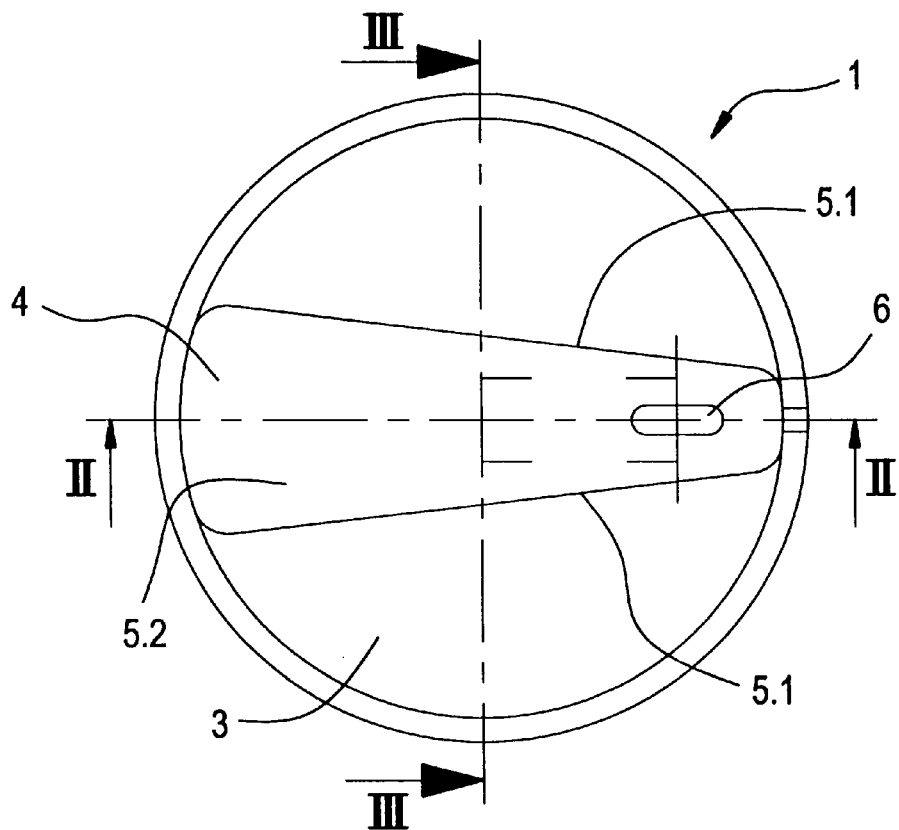
FIG. 1 is a top view of a control-knob top part of this invention.

FIG. 1 shows a top part 3 of a control knob 1, the control knob comprising, in a known manner, a companion part 2 as a control-knob base (see FIG. 5) and the cap-shaped control-knob top part 3. The control-knob top part 3 has a wedge-shaped grip handle 4 having side surfaces on broad sidewalls 5.1. There is a recess for receiving a transparent enclosing surface member 6 in a facing wall 5.2 of the grip handle 4.

Figure 2:
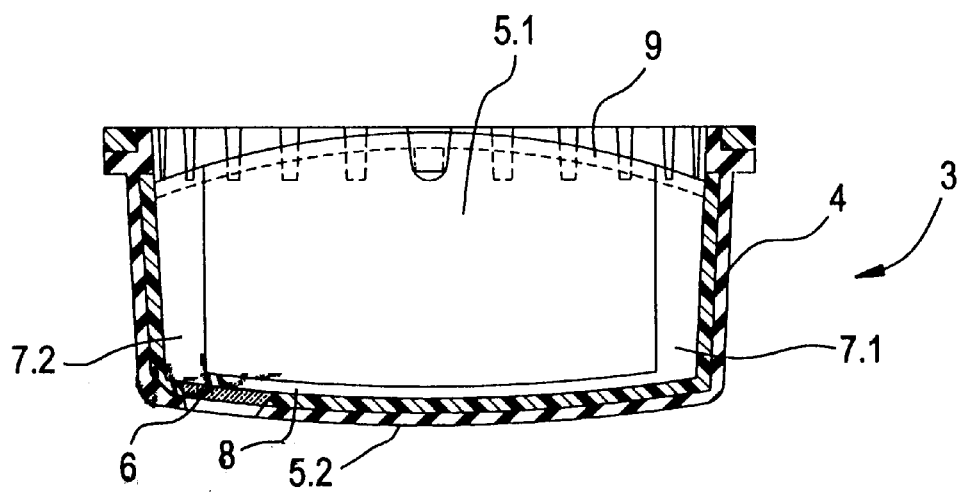
FIG. 2 is an upside-down side cross-sectional view of the control-knob top part taken on line II—II in FIG. 1.

As illustrated in FIG. 2, support members 7.1 and 7.2 are located at narrow end walls of the grip handle 4, inside the grip handle 4, which are preferably connected to each other via a stirrup 8. The stirrup 8 may be attached to top or side portions of the support members 7.1 and 7.2, and is formed as a single piece of material with these support members 7.1 and 7.2. The support members 7.1 and 7.2 are respectively arranged on a plate 9, perpendicular thereto, at two opposite locations, and they have a columnar, hollow, shape. The plate 9 is preferably made of a light-conducting material and is coupled with the transparent surface member 6 via the support member 7.2. In addition, the support members 7.1 and 7.2 and the stirrup 8 are preferably made of a light-conducting material. The plate 9 and the support members 7.1 and 7.2 form a component, or unfinished part, of the control-knob top part 3 and can be made of the same material as a single piece (single part). An elastic material, an elastomer, is injection molded, extrusion-coated, or sprayed over the plate 9 and the support members 7.1 and 7.2, thereby completing the control-knob top part 3.

This elastomer, such as a silicon, has a Shore hardness of 30 to 80, preferably a Shore hardness of 60.

Figure 3:
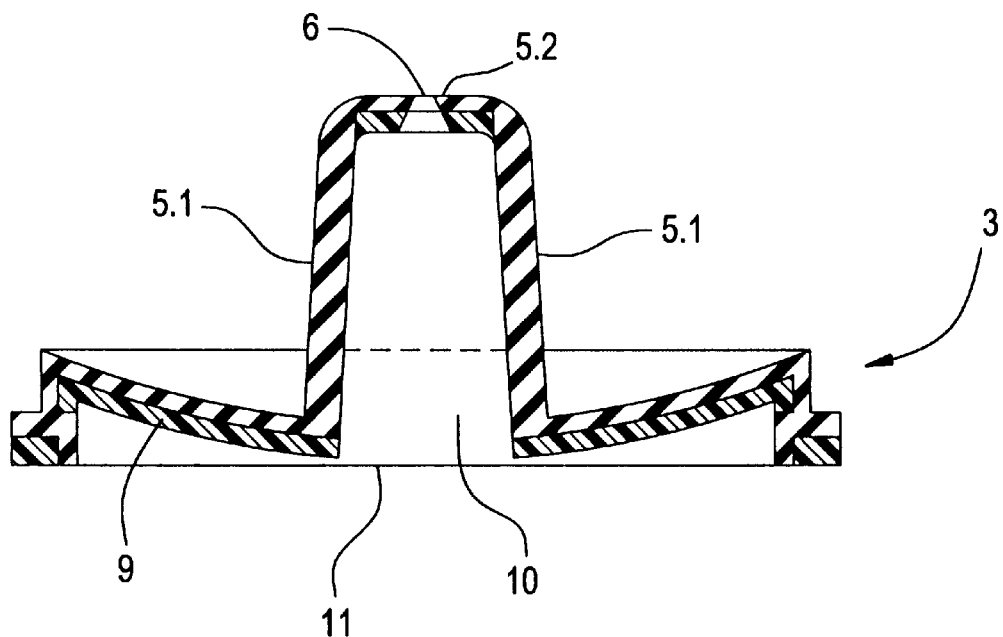
FIG. 3 is a cross-sectional view of the control-knob top part taken on line III—III in FIG. 1, in a normal condition.

The control-knob top part 3 is concave in the area of the plate 9 (see FIG. 3). An open space 10 having an inward-facing opening 11 is defined between the support members 7.1 and 7.2, inside the sidewalls 5.1 and the facing wall 5.2. In a conventional manner, an axle shaft of an adjusted member, with or without a light source, such as a switch or a potentiometer, can pass through this opening 11. In addition to the Shore hardness of the material used and the wall thickness of the sidewalls 5.1, the open space 10 inside the grip handle 4 is a determining factor for the elasticity of the sidewalls 5.1, i.e. for their flexibility.

Thus, low Shore hardness values and a large open space 10 between the sidewalls 5.1 and small wall thicknesses of the sidewalls 5.1 produce higher degrees of flexibility and movement of the sidewalls 5.1 than do higher Shore hardness values, smaller open spaces 10 between the sidewalls 5.1, and greater wall thicknesses of the sidewalls 5.1. It should be noted that an excessively low Shore hardness value results in rapid wear of the grip handle 4.

Figure 4:
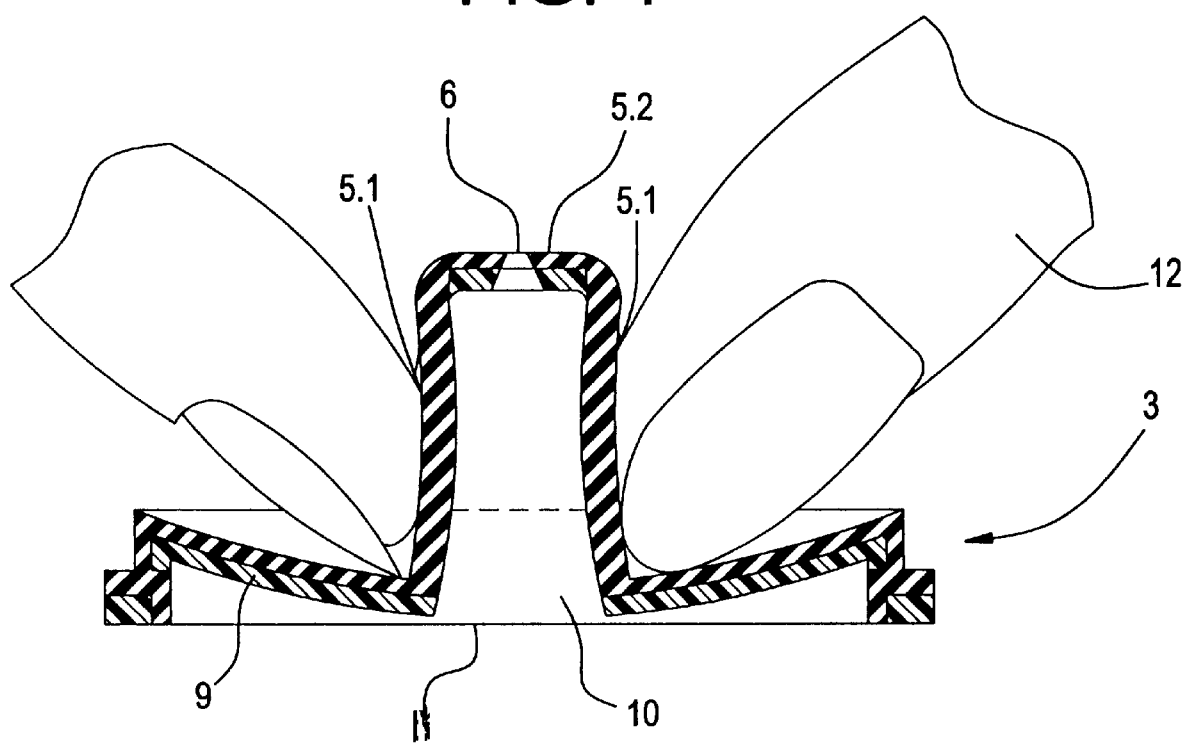
FIG. 4 is a view similar to FIG. 3, but also showing fingers squeezing the control knob top part for operation of the control knob.
Figure 5:
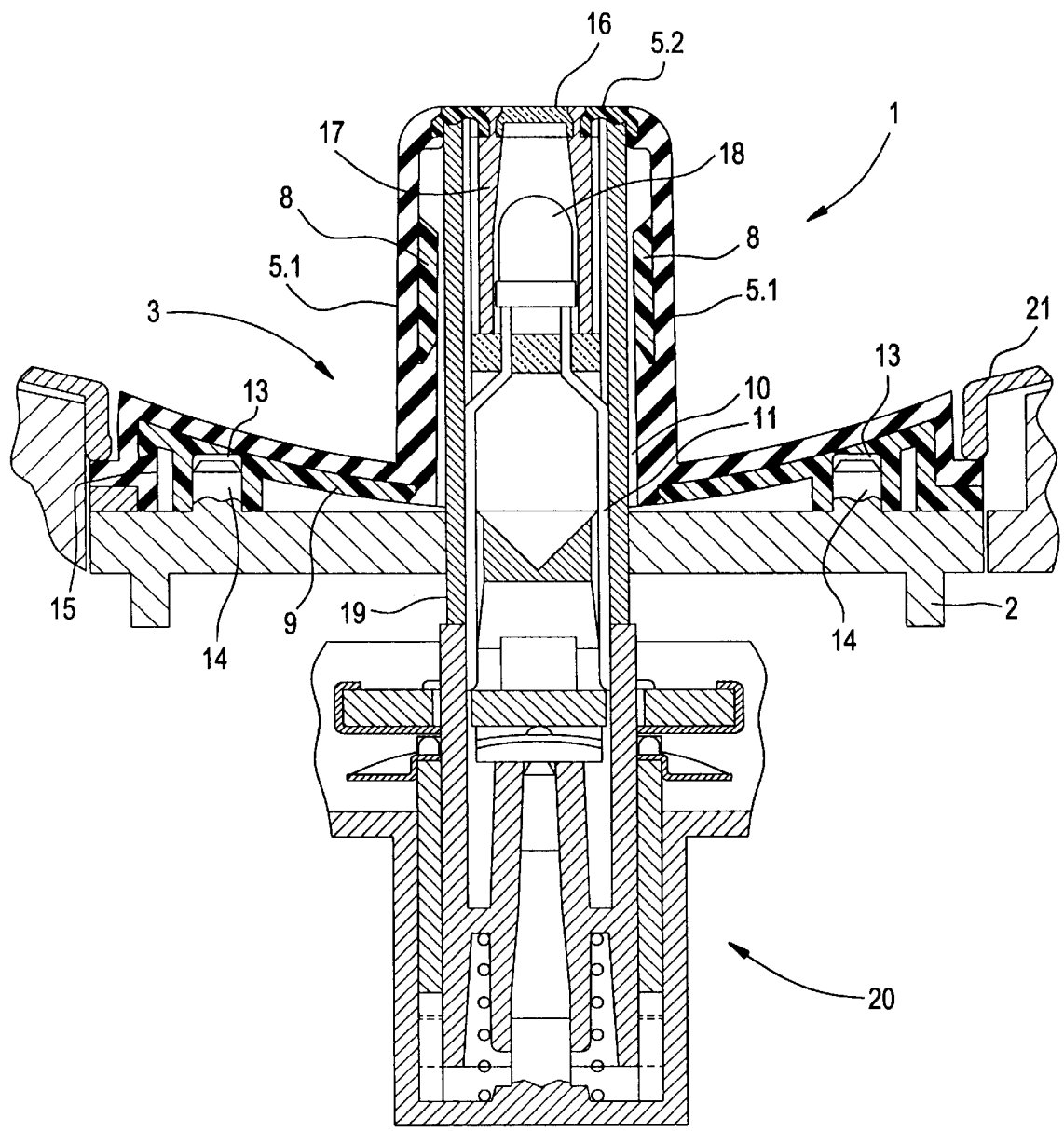
FIG. 5 is a sectional view of a complete control knob of an enhanced embodiment of this invention, as installed, with push-button functions.

As shown in FIG. 4, an operator's fingers 12 grasps the sidewalls 5.1 of the grip handle 4 of the control-knob top part 3. In so doing, the fingers 12 deform the sidewalls 5.1 at the grip handle 4 by application of a slight pressure, while achieving a good grasp on the grip handle 4 of the control knob 1. The described design of the control-knob top part 4 with support members 7.1 and 7.2 provides internal stability, so that when the control-knob top part 3 is turned, the companion part 2, to which it is attached, moves with it (as indicated in FIG. 5). The control-knob top part 3 is fastened to the companion part 2 by snap-in fasteners, for example, with snap openings in the support members 7.1 and 7.2 and snap-in fasteners on the companion part 2. As shown in FIG. 5, attachment may be accomplished by means of guide holes 13 on the plate 9 and pins 14 on the companion part 2. A member to be adjusted (adjusted member) is fastened to the companion part 2 in a conventional manner so that the member to be adjusted is moved, as well.

In the example of the embodiment shown in FIG. 5, the control knob 1 is designed so that a switching plunger 19 extends into the control-knob top part 3. An upper space between the support members 7.1 and 7.2 in the grip handle 4 is without an upper stirrup 8 and an elastic facing wall 5.2 is designed to be flexible and elastic, due to material (elastomer) used. By pressing on the facing wall 5.2 of the grip handle 4 in an area of the open space 10, the facing wall 5.2 is deformed. In a preferred embodiment of the invention, the facing wall 5.2 also has a transparent insert 16 having symbolic characters thereon. A hollow nipple 17, having an internal diameter corresponding to that of an external diameter of an illumination source 18, and which narrows cylindrically toward the facing wall 5.2, is located under this insert 16 and is engaged with the facing wall 5.2. At the same time, the tubular plunger 19 of a push-button element 20 extends through the opening 11 into the open space 10 in the control-knob top part 3, creating a push-button connection between the facing wall 5.2 and a push-button element 20. A conventional push-button or snap mechanism of the push-button element 20, located beneath the tubular plunger 19, converts the deformation of the facing wall 5.2, in a known manner, into a switching, or push-button, function.

The control-knob top part 3 with its grip handle 4 can be manufactured in accordance with known injection molding techniques. Injection molds used for this purpose are determined by the design of the control-knob top part 3. First the plate 9, with support members 7.1 and 7.2 and the stirrup 8, that may be used for connecting them, are manufactured as an unfinished component of the control-knob top part 3, whereby the plate 9 preferably has small openings/holes 15 along its outer edge. Then this unfinished component is injection-coated, or spray coated, with the elastomer. In this process, the elastomer enters and fills the small holes 15, providing for better gripping.

Because of the elastomer coating of the control-knob top part 3, once the control knob 1 is installed in a cavity of a cover 21 of a dashboard panel, a soft material lies adjacent the dashboard panel cover 21. Noises are thereby prevented when the control knob 1 is turned, and, although the material used for the control-knob top part 3 is nonrigid, it is not damaged by the cover 21.

While the invention has been particularly shown and described with reference to a preferred embodiment, it will be understood by those skilled in the art that various changes in form and detail may be made therein without departing from the spirit and scope of the invention. For example, the plate 9, the support members 7.1 and 7.2, and the stirrup 8 may be made of other materials that support (stabilize) the control-knob top part 3, if it is unnecessary to indicate the position of the control knob 1, and also the transparent enclosing surface member 6 can be omitted. The grip handle 4 may also be round, so that the sidewalls 5.1 grasped by the fingers 12 are circular.

Figure 6:
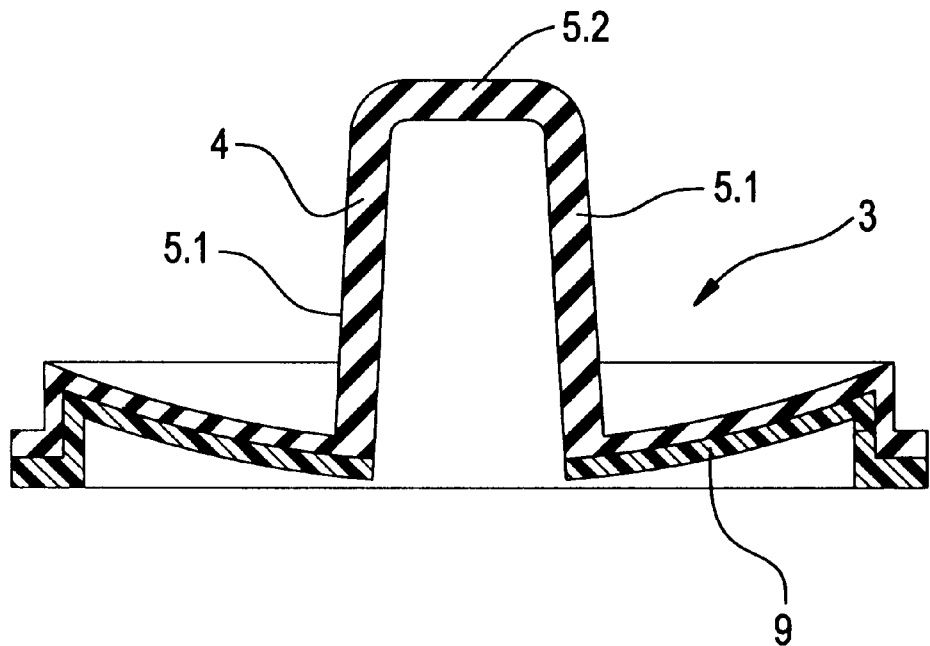
FIGS. 6 and 7 are views similar to FIGS. 2 and 3, but of another embodiment.
Figure 7:
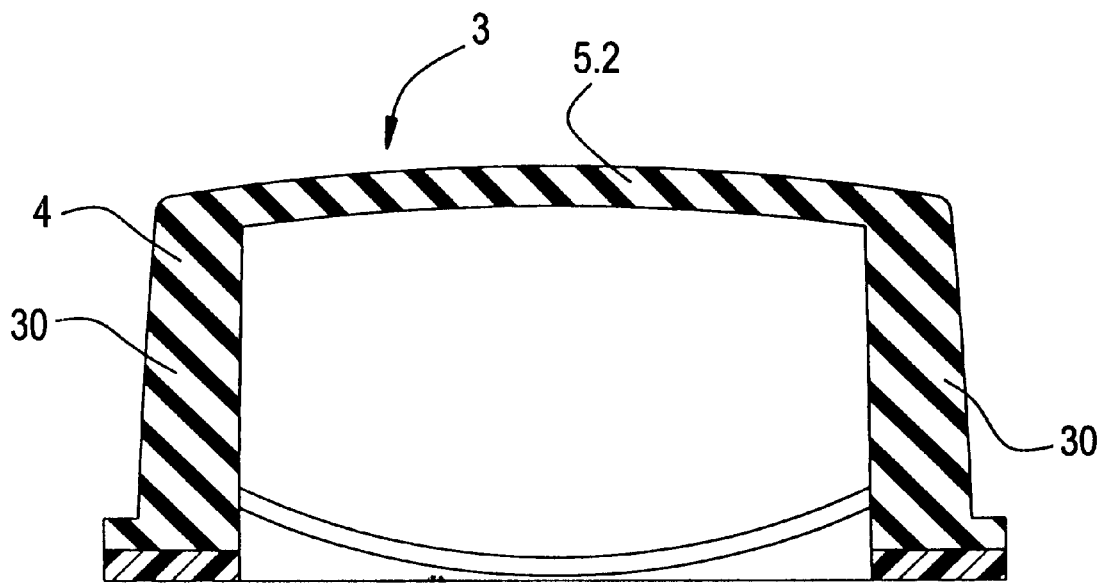

By use of additional special injection molding techniques, it is possible to design the control-knob top part 3 as an injected-molded part of an elastic elastomer, whereby the plate 9 is injected of a hard material, and the hollow grip handle 4 extending from this base is made to have greater wall thickness at narrow end walls 30 than at the sidewalls 5.1 (see FIGS. 6 and 7).

In this embodiment, the plate 9 serves to increase an internal stability of the control-knob top part 3. The support members 7.1 and 7.2 are omitted, because their finction is fulfilled by the greater wall thicknesses at the narrow end walls. The grip handle 4 is thus made exclusively of the elastomer, whereby the areas of the narrow end walls are solid, and are designed to be a single piece with the sidewalls. The sidewalls 5.1 themselves are flexible and can be deformed. The flexible design of the facing wall 5.2 makes it possible to integrate a switch function into the control-knob top part 3 in this embodiment, as well.

Because the control-knob top part of this invention is made of a nonrigid material, it is easy to grasp. In addition to this ease of handling, a maximum of an adjusting force applied to the control knob is transmitted to an adjusted member, since the control knob is stable both exteriorly and interiorly of sidewalls of the grip handle.

The stability of the control knob top portion is increased by placing the stirrup(s) 8 in the grip handle. When a light conducting material is used as the component material for the control-knob top part, additional distribution of light within the control-knob top part is not needed. Improved serviceability of the control-knob top part is provided by the concave design of the unfinished part in the area of the grip handle.

Switch functions can be integrated into the control-knob top part, resulting in increased space savings on the instrument panel.

The invention claimed is:

1. A control-knob top part for manipulating a controlled element of a device, said control-knob top part including a means for coupling said control-knob top part, to the controlled element at an inwardly-facing side thereof and having a hollow grip handle (4), wherein:

the control-knob top part (3) is formed of a hard-material component part having a surrounding coating of an elastomer material formed on the hard material component part, wherein the hard-material component part comprises a plate (9) defining an opening in a central portion thereof communicating with a hollow space of said hollow grip handle and having spaced perpendicular columnar support members (7.1, 7.2) opposite each other on opposite sides of the opening, and being attached to the plate, and wherein the coating coats a portion of the, plate and defines said hollow space by forming elastic sidewalls of the grip handle extending between the perpendicular columnar supports, on opposite sides thereof, thereby enclosing said hollow space (10) between the columnar support members at said opening; said support members (7.1, 7.2) and the coating forming the grip handle (4) with said coating providing elastic give into said hollow space and said support members supporting and stabilizing said coating.

2. A control-knob top part as in claim 1, wherein the elastomer material is a silicon with a Shore hardness value of 30 to 80 Shore.

3. A control-knob top part as in claim 1, wherein a stirrup (8) is at a facing wall of the grip handle, said facing wall being the wall of said grip handle spaced furthest from said plate, said stirrup being fixedly attached to and extending between the support members (7.1, 7.2).

4. A control-knob top part as in claim 1, wherein there are two stirrups and wherein said stirrups (8) are placed opposite each other fixedly attached to and extending between the support members (7.1, 7.2) at the sidewalls (5.1) of the grip handle (4).

5. A control-knob top part as in claim 1, wherein the hard-material component part of the control-knob top part (3) is made of a light-conducting material.

6. A control-knob top part as in claim 1, wherein an outer surface of the plate (9) surrounding said grip handle is concave into which fingers of a user gripping said grip handle can extend.

7. A control-knob top part as in claim 1, wherein a facing wall (5.2) of the hollow grip handle, which is the wall of the grip handle spaced furthest from the base plate, is also deformable into an open space (10) formed by said grip handle.

8. A control-knob top part as in claim 7, wherein said facing wall (5.2) includes said means for coupling.

9. A control-knob top part as in claim 7, wherein a transparent insert (16) with symbolic characters is mounted in said facing wall (5.2), for providing an outlet for light.

10. A control-knob top part as in claim 1, wherein a facing wall (5.2) of the control-knob top part (3) is also deformable into an open space (10) formed by said grip handle.

\* \* \* \* \*